(12) United States Patent
Shirakawa

(10) Patent No.: US 6,937,777 B2
(45) Date of Patent: Aug. 30, 2005

(54) IMAGE SENSING APPARATUS, SHADING CORRECTION METHOD, PROGRAM, AND STORAGE MEDIUM

(75) Inventor: Yusuke Shirakawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 611 days.

(21) Appl. No.: 10/053,189

(22) Filed: Jan. 15, 2002

(65) Prior Publication Data

US 2002/0094131 A1 Jul. 18, 2002

(30) Foreign Application Priority Data

Jan. 17, 2001 (JP) ..................................... 2001-009474

(51) Int. Cl.$^7$ ................................................. G06K 9/40
(52) U.S. Cl. ...................... 382/274; 382/260; 382/275; 382/255; 358/3.26; 358/3.27; 358/461
(58) Field of Search ............................... 382/252, 255, 382/260, 274, 275; 358/1.2, 3.26, 3.27, 512, 515, 518, 463, 461

(56) References Cited

U.S. PATENT DOCUMENTS

| | | | | |
|---|---|---|---|---|
| 5,243,377 A | * | 9/1993 | Umatate et al. | 355/53 |
| 5,365,058 A | * | 11/1994 | Wheeler et al. | 250/216 |
| 5,712,732 A | * | 1/1998 | Street | 359/630 |
| 5,818,523 A | | 10/1998 | Ban | 348/224 |
| 5,831,672 A | * | 11/1998 | Takei | 348/225.1 |
| 5,850,575 A | * | 12/1998 | Ohishi | 396/52 |
| 5,990,941 A | * | 11/1999 | Jackson et al. | 348/207.99 |
| 6,088,537 A | * | 7/2000 | Ohtaka et al. | 396/81 |
| 6,191,808 B1 | * | 2/2001 | Katayama et al. | 348/39 |
| 6,290,792 B1 | * | 9/2001 | Akiyama et al. | 156/73.5 |
| 6,728,043 B2 | * | 4/2004 | Gruner et al. | 359/637 |
| 6,795,113 B1 | * | 9/2004 | Jackson et al. | 348/143 |

FOREIGN PATENT DOCUMENTS

| | | |
|---|---|---|
| JP | 6-197266 | 7/1994 |
| JP | A8-294133 | 11/1996 |
| JP | 2000-196953 | 7/2000 |

* cited by examiner

Primary Examiner—Kanjibhai Patel
Assistant Examiner—Yosef Kassa
(74) Attorney, Agent, or Firm—Morgan & Finnegan, LLP

(57) ABSTRACT

This invention has as its object to eliminate sensitivity nonuniformity on the plane of an image sensing element irrespective of exchange of a lens. To achieve this object, in an image sensing apparatus which has an image sensing element and can exchange a lens, a memory stores shading correction coefficients respectively corresponding to pixels in a two-dimensional matrix on the plane of the image sensing element, and a correction device makes a correction calculation of pixel data read out from each pixel of the image sensing element by extracting the shading correction coefficient associated with the corresponding pixel from those stored in the memory.

24 Claims, 12 Drawing Sheets

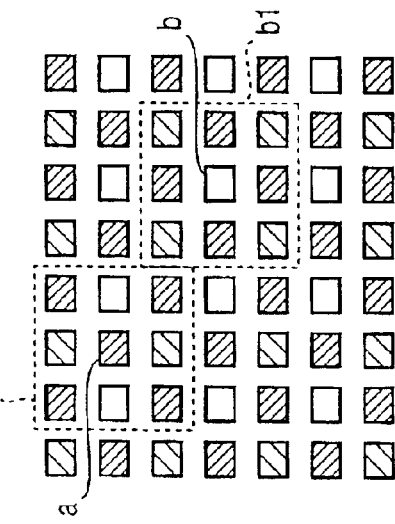

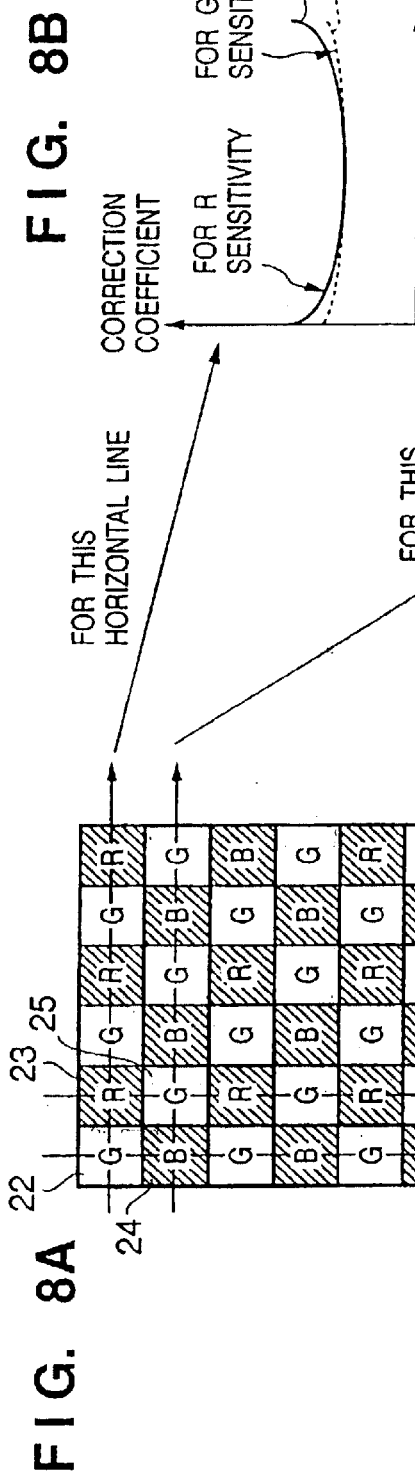
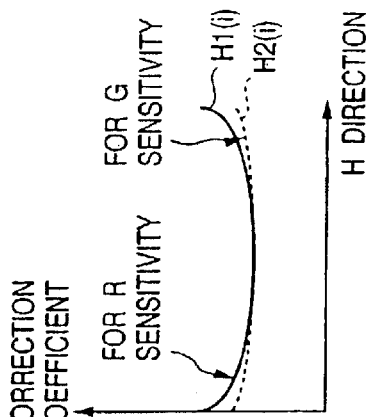
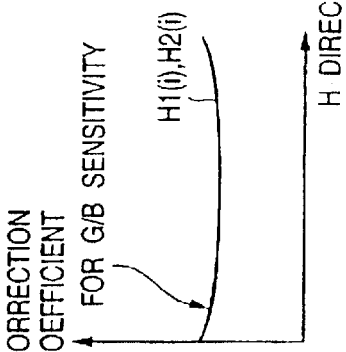
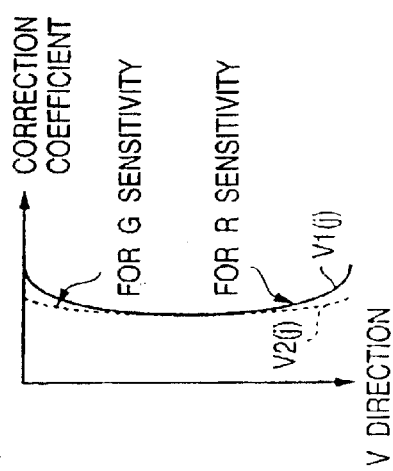
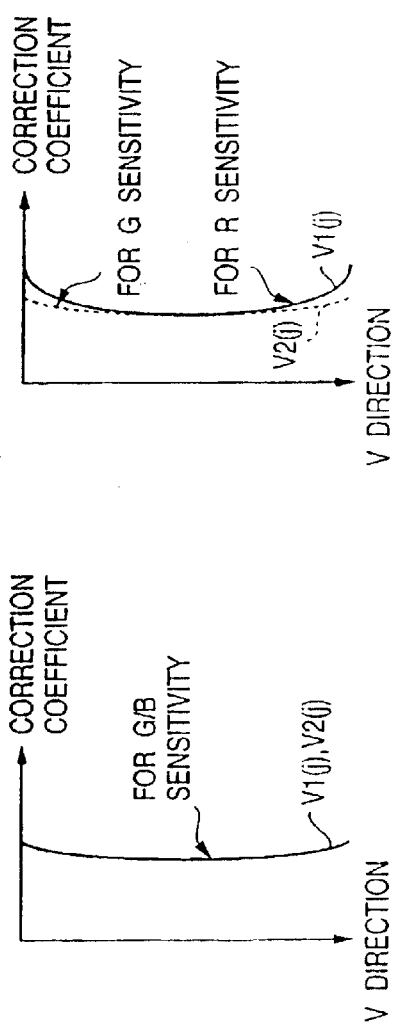

United States Patent …

IMAGE SENSING APPARATUS, SHADING CORRECTION METHOD, PROGRAM, AND STORAGE MEDIUM

FIELD OF THE INVENTION

The present invention relates to an image sensing apparatus, shading correction method, and storage medium and, more particularly, to an image sensing apparatus that uses an exchangeable image sensing lens, a shading correction method applied to the image sensing apparatus, and a storage medium that stores a program for implementing the shading correction method.

BACKGROUND OF THE INVENTION

FIG. 10 is a block diagram showing an example of the arrangement of a conventional lens-exchangeable digital still camera.

Referring to FIG. 10, a camera operation switch 43 comprises a main SW and release SW. When a photographer has operated the camera operation switch 43, a total control circuit 44 detects a change in state of the camera operation switch 43, and starts power supply to other circuit blocks.

An object image within a photographing frame range forms on an image sensing unit 34 via a main photographing optical system 33, and the image sensing unit 34 outputs an electrical signal to an A/D converter 35. The electrical signal is converted in turn into a predetermined digital signal for each pixel, and the digital signal is sent to a process circuit 36. The process circuit 36 generates R, G, and B color signals based on pixel data, and periodically transfers the generation results for each frame to a video memory 41 via a memory controller 37 while the photographer performs pre-photographing operation. A monitor display 42 makes viewfinder display and the like based on the data transferred to the video memory 41.

On the other hand, when the photographer has made photographing operation on the camera operation switch 43, pixel data for one frame output from the process circuit 36 are stored in a frame memory 38 in response to a control signal from the total control circuit 44 that detects a change in state of the camera operation switch 43. Subsequently, the data in the frame memory 38 is compressed by the memory controller 37 and a work memory 39 in a predetermined compression format, and the compression result is stored in an external memory 40. Note that the external memory 40 comprises a nonvolatile memory such as a flash memory or the like.

In order to display an image based on photographed image data, the memory controller 37 decompresses the compressed data stored in the external memory 40 to normal data for respective photographing pixels, and transfers the decompression result to the video memory 41. The monitor display 42 makes viewfinder display and the like based on the data transferred to the video memory 41.

An image sensing element used in such conventional lens-exchangeable digital camera uses microlenses shown in FIGS. 11A and 11B for respective photosensitive pixels of the image sensing element so as to improve photosensitivity for each pixel.

FIGS. 11A and 11B show the principle of shading (spatial sensitivity nonuniformity depending on the incident angle of incoming light from a lens) produced depending on the relationship between the microlens position and the angle of incoming light from the lens. Referring to FIGS. 11A and 11B, reference numeral 20 denotes a lens as a field lens; 21, microlenses; and 22, photosensitive portions of the image sensing element.

Since the microlenses 21 are provided for respective photosensitive portions 22 of the pixels of the image sensing element, even when each photosensitive portion 22 of the image sensing element has a narrow effective sensitivity region, marginal light can be effectively focused on the photosensitive portion 22.

However, when light rays that have passed through the lens 20 nearly perpendicularly strike the photosensitive portion 22 of the image sensing element, as shown in FIG. 11A, the incoming light rays focus on the photosensitive portion 22 of the image sensing element without posing any serious problem. However, when light rays that have passed through the lens 20 obliquely strike the image sensing element, as shown in FIG. 11B, only some incoming light rays become incident on each photosensitive portion in a region (peripheral portion of the image sensing element) separated from the optical axis of the lens 20 due to the optical relationship between the lens 20 and microlenses 21.

Such light amount drop is normally called white shading. This phenomenon becomes conspicuous as the pixel position on the image sensing element separates farther away from the optical axis of the lens 20.

A method of correcting white shading generated by a combination of the lens 20 and microlenses 21 on the image sensing element is disclosed in, e.g., Japanese Patent Laid-Open No. 6-197266. In this method, shading correction data is stored in advance in an internal memory of a lens, and is read out upon photographing. A reference voltage of an analog/digital conversion circuit is generated based on the readout data, and an analog sensed image signal is converted into a digital signal based on this reference voltage, thus implementing shading correction.

When the conventional lens-exchangeable digital camera uses the same optical system (e.g., an exchangeable lens system) as that in a conventional single-lens reflex silver halide film camera, it requires an image sensing element with a size considerably larger than that of an image sensing element of a digital camera that cannot use such optical system.

However, in such large-size image sensing element, the incident angle of light rays on the peripheral portion of the image sensing element becomes large depending on lenses. In such case, sensitivity nonuniformity (shading), i.e., a decrease in sensitivity on the peripheral portion of the image sensing element where the incident angle becomes large, is produced due to the microlens position, manufacturing errors of on-chip color filters, device structure of the image sensing element, and the like. Such problem will be explained below.

As shown in FIGS. 11A and 11B, a recent solid-state image sensing element comprises the microlenses 21 for focusing incoming light onto photodiodes (photosensitive portions 22 of the image sensing element) to improve sensitivity. However, when the incident angle of incoming light becomes large, the incoming light refracted by the microlens 21 is focused at a position separated away from the center of each photodiode, thus decreasing the sensitivity of that pixel.

Conventionally, an image sensing apparatus that makes shading correction in consideration of an increase in incident angle of incoming light on the peripheral portion of the image sensing element due to the characteristics of the lens that forms an object image is available, as disclosed in Japanese Patent Laid-Open No. 6-197266. However, in an image sensing apparatus system that can exchange lenses, the incident angle characteristics of incoming light rays to the image sensing element change drastically upon exchanging lenses, and shading correction cannot be accurately done.

Even when a single lens is used without exchanging lenses, if that lens is a zoom lens, since the exit pupil position of the lens changes when the photographing field angle has changed or when the lens is brought into focus to objects at different distances, the incident angle of incoming light into the peripheral portion of the image sensing element changes, and shading correction cannot be accurately done.

Furthermore, FIGS. 12A to 12C show the generation principle of color shading due to multi-layered type reflective infrared cut filters. FIG. 12A shows spectral transmission characteristics of the reflective infrared cut filters depending on the incident angles, FIG. 12B shows an example of spectral sensitivity characteristics of an image sensing element which comprises on-chip color filters, and FIG. 12C shows the sensitivity of a red filter pixel. FIGS. 12A to 12C exemplify an image sensing element which has RGB primary color type on-chip color filters. Note that the wavelength on the abscissa of FIG. 12A has the same level scale as that of the wavelength on the abscissa of FIG. 12B.

Assume that light which has passed through the infrared cut filters having the spectral transmission characteristics shown in FIG. 12A enters the image sensing element having the spectral sensitivity characteristics shown in FIG. 12B. In this case, as can be seen from FIGS. 12A and 12B, the spectral transmission characteristics of the infrared cut filters have no dependence on incident angle in the wavelength ranges of blue and green color filters, but have large dependence on incident angle in the wavelength range of a red color filter. The sensitivity characteristics of a signal output from the image sensing element are expressed by the product of the spectral transmission characteristics of the infrared cut filters and the spectral sensitivity characteristics of the image sensing element. Therefore, when the incident angle of incoming light is large, sensitivity drop of pixels having red color filters occurs, and color shading, i.e., a decrease in sensitivity of only pixels having red filters on the peripheral portion of the image sensing element is produced, as shown in FIG. 12C.

SUMMARY OF THE INVENTION

The present invention has been made in consideration of the aforementioned problems, and has as its object to provide an image sensing apparatus, shading correction method, and storage medium, which can remove sensitivity nonuniformity on the image sensing element plane irrespective of exchange of lenses in an image sensing apparatus which uses an exchangeable lens.

It is another object of the present invention to provide an image sensing apparatus, shading correction method, and storage medium, which can correct color shading produced in a specific color channel of an image sensing element.

In order to solve the aforementioned problems and to achieve the above objects, an image sensing apparatus according to the first aspect of the present invention is characterized by the following arrangement.

That is, an image sensing apparatus which comprises an image sensing element and can exchange a lens, comprises a storage device for storing shading correction coefficients respectively corresponding to pixels in a two-dimensional matrix on a plane of the image sensing element, and a correction device for making a correction calculation of pixel data read out from each pixel of the image sensing element by extracting the shading correction coefficient associated with the corresponding pixel from the shading correction coefficients stored in the storage device, the storage device stores the shading correction coefficients while classifying the shading correction coefficients into components in two orthogonal directions on the plane of the image sensing element, and the correction device extracts two shading correction coefficients from the shading correction coefficients stored in the storage device in accordance with addresses of the corresponding pixel in the two directions, and multiplies the pixel data read out from the corresponding pixel by the two extracted shading correction coefficients in turn to correct the pixel data.

An image sensing apparatus according to the second aspect of the present invention is characterized by the following arrangement.

That is, an image sensing apparatus which comprises an image sensing element and can exchange a lens, comprises a storage device for storing shading correction coefficients respectively corresponding to pixels of the image sensing element, and a correction device for making a correction calculation of pixel data read out from each pixel of the image sensing element by extracting the shading correction coefficient associated with the corresponding pixel from the shading correction coefficients stored in the storage device, and the correction device independently corrects pixels which are influenced by a color filter, which does not transmit a specific wavelength range and is inserted between the lens and the image sensing element, and pixels which are not influenced by the color filter, on the basis of shading correction coefficients stored in the storage device.

A shading correction method according to the first aspect of the present invention is characterized by the following arrangement.

That is, a shading correction method applied to an image sensing apparatus, which comprises an image sensing element and can exchange a lens, comprises the storage step of storing in a storage device shading correction coefficients respectively corresponding to pixels in a two-dimensional matrix on a plane of the image sensing element, and the correction step of making a correction calculation of pixel data read out from each pixel of the image sensing element by extracting the shading correction coefficient associated with the corresponding pixel from the shading correction coefficients stored in the storage device, the storage step includes the step of storing in the storage device the shading correction coefficients while classifying the shading correction coefficients into components in two orthogonal directions on the plane of the image sensing element, and the correction step includes the step of extracting two shading correction coefficients from the shading correction coefficients stored in the storage device in accordance with addresses of the corresponding pixel in the two directions, and multiplying the pixel data read out from the corresponding pixel by the two extracted shading correction coefficients in turn to correct the pixel data.

A shading correction method according to the second aspect of the present invention is characterized by the following arrangement.

That is, a shading correction method applied to an image sensing apparatus, which comprises an image sensing element and can exchange a lens, comprises the image sensing step of obtaining pixel data from the image sensing element, and the correction step of making a correction calculation of pixel data read out from each pixel of the image sensing element by extracting the shading correction coefficient associated with the corresponding pixel from shading correction coefficients stored in a storage device, which stores shading correction coefficients respectively corresponding to pixels of the image sensing element, and the shading correction coefficients are independently stored in the storage device in correspondence with pixels which are influenced by a color filter, which does not transmit a specific wavelength range and is inserted between the lens and the image sensing element, and pixels which are not influenced by the color filter.

A program according to the present invention is characterized by the following arrangement.

That is, a program makes a computer implement the shading correction method.

A storage medium according to the present invention is characterized by the following arrangement.

That is, a storage medium computer-readably stores the program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 2A to 2D show a color interpolation process;

FIGS. 4A to 4C show shading correction coefficients in the embodiment of the present invention, in which FIG. 4A shows a plane of an image sensing element, FIG. 4B shows horizontal shading correction coefficient components, and FIG. 4C shows vertical shading correction coefficient components;

FIGS. 8A to 8E show an RGB primary color Bayer filter matrix, and shading correction coefficients corresponding to the matrix;

DETAILED DESCRIPTION OF THE PREFERRED EMBODIMENTS

A preferred embodiment of the present invention will be described hereinafter with reference to the accompanying drawings.

Figure 1:
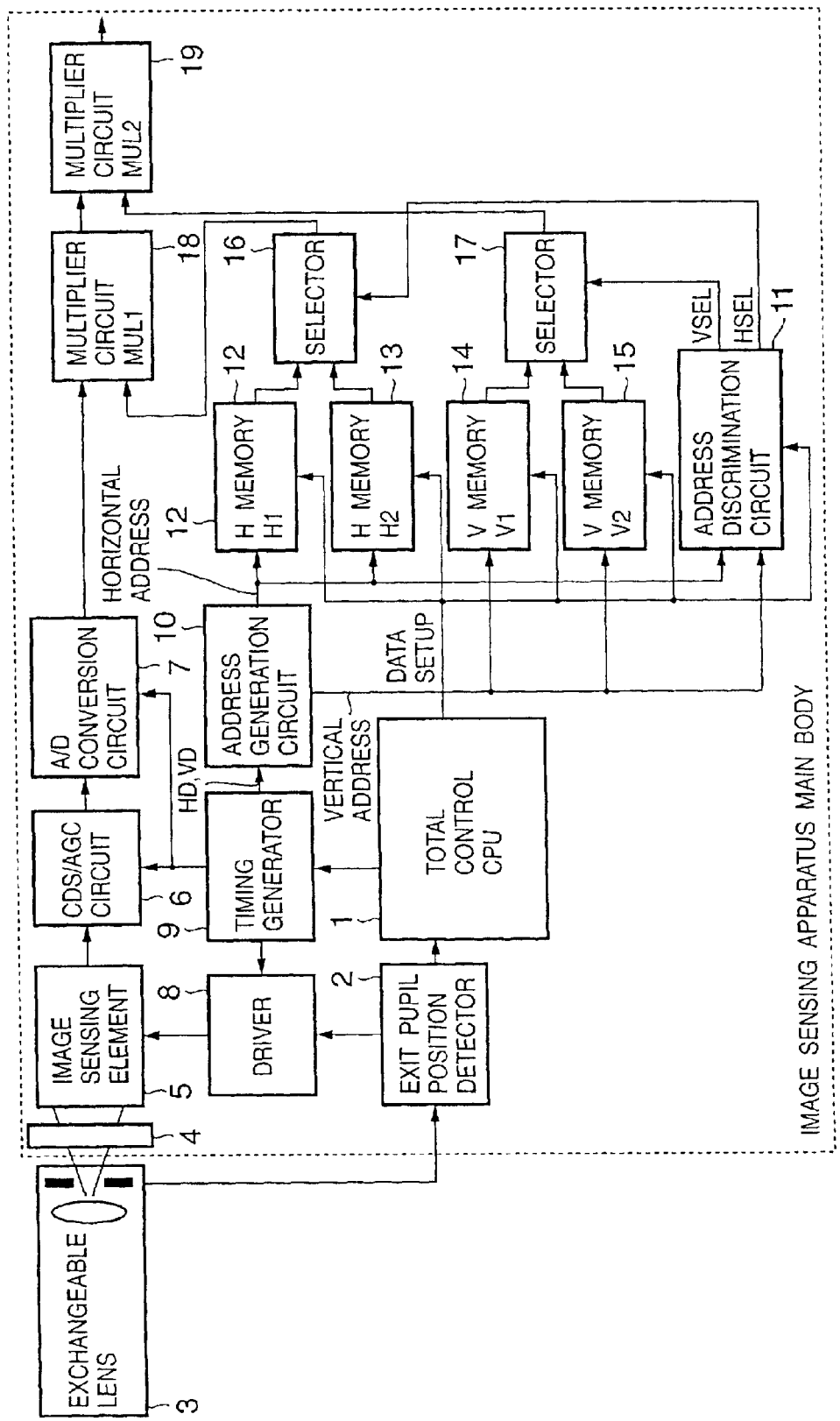
FIG. 1 is a block diagram showing the arrangement of an image sensing apparatus (digital still camera) according to an embodiment of the present invention.

FIG. 1 is a block diagram showing the arrangement of an image sensing apparatus (digital still camera) according to an embodiment of the present invention. This image sensing apparatus can exchange lenses.

Referring to FIG. 1, reference numeral 1 denotes a total control CPU for controlling the overall camera; 2, an exit pupil position detector; and 3, an exchangeable lens. The exchangeable lens 3 includes exit pupil position information, and the detector 2 detects the exit pupil position information included in the exchangeable lens 3, generates encode information by correcting the detected value, and outputs the generated information to the CPU 1.

The exit pupil position information is used to calculate shading correction coefficients, as will be described later. Before that calculation, the exit pupil position information is corrected according to at least one of the zoom position, focus position, image height, and aperture value of the exchangeable lens 3. More specifically, the exit pupil position is normally expressed by the distance between a lens and image sensing element on the optical axis, and changes in synchronism with a change in zoom or focus position. As is also known, the exit pupil position slightly changes when the image height (the distance between the position of a pixel of interest and a point on the optical axis on the image sensing element plane) changes. Furthermore, when the aperture value changes, the range of the incident angle of light that strikes the pixel of interest of the image sensing element changes. Since these changes appear as errors upon calculating the shading correction coefficients, the exit pupil position information of the exchangeable lens 3 is corrected in accordance with at least one of the zoom position, focus position, image height, and aperture value of the exchangeable lens 3, so as to attain accurate shading correction.

Reference numeral 4 denotes multi-layered reflection type infrared cut filters; and 5, an image sensing element. The image sensing element 5 comprises, e.g., a charge transfer element such as a CCD or the like. An object image is formed on the image sensing element 5 via the exchangeable lens 3, and the image sensing element 5 reads out charges accumulated as a result of image formation in turn for respective pixels and outputs them to a CDS/AGC circuit 6. The CDS/AGC circuit 6 suppresses noise components such as reset noise and the like generated in the image sensing element 5, then amplifies the charge signals to an appropriate level, and outputs these signals to an A/D conversion circuit 7. The A/D conversion circuit 7 converts luminance data of the object corresponding to the above charge amount into digital data. Since optical color filters used to generate color signals (e.g., R, G, and B signals) are adhered onto the image sensing element 5, the output signals from the image sensing element 5 indicate respective colors in turn.

Reference numeral 8 denotes a driver for supplying electric energy required to accumulate charges on respective elements of the image sensing element 5 to those elements. More specifically, the driver 8 supplies electric energy by scanning the image sensing element 5 two-dimensionally on the basis of timing signals sent from a timing generator 9.

The timing generator 9 supplies a horizontal sync signal HD and vertical sync signal VD to an address generation circuit 10, which generates address signals based on these sync signals.

Reference numerals 12 to 15 denote memories for storing correction data required to make sensitivity correction (shading correction) of the image sensing element 5 (to be described later): reference numeral 12 denotes an H memory H1 that stores first horizontal correction data; 13, an H memory H2 that stores second horizontal correction data; 14, a V memory V1 that stores first vertical correction data; and 15, a V memory V2 that stores second vertical correction data.

An address discrimination circuit 11 outputs predetermined signals HSEL and VSEL on the basis of the address signals output from the address generation circuit 10.

Reference numerals 16 and 17 denote selectors for selecting from the output signals sent from the memories 12 to 15 on the basis of the predetermined signals HSEL and VSEL sent from the address discrimination circuit 11, and outputting horizontal and vertical correction data.

Reference numeral 18 denotes a multiplier circuit MUL1 for multiplying output levels for respective pixels output from the A/D conversion circuit 7 by the horizontal correction data obtained via the selector 16. Reference numeral 19 denotes a multiplier circuit MUL2 for multiplying the outputs from the multiplier circuit (MUL1) 18 by the vertical correction data obtained via the selector 17.

Pixel data, which have undergone sensitivity correction (shading correction) and are output from the multiplier circuit (MUL2) 19, are normally sent to a process circuit (not shown), and then undergo dark level correction, γ conversion, and a color interpolation process. The processing result is stored in a memory (not shown).

FIGS. 2A to 2D show the color interpolation process. FIG. 2A shows a pixel matrix of the image sensing element 5, FIG. 2B shows a G (green) interpolation filter, FIG. 2C shows an R (red)/B (blue) interpolation filter, and FIG. 2D shows a pixel matrix after the interpolation process. The color filter matrices used in the image sensing element are general Bayer matrices, which include a staggered matrix for G, as shown in FIG. 2B, and a line sequential matrix for R/B, as shown in FIG. 2C.

In case of a single-plate image sensing element, since not all pixels have RGB information, it is a common practice to generate RGB color information at all pixel points on the image sensing element by interpolation operations using 3×3 matrices shown in FIGS. 2B and 2C. This process will be described in detail below.

For example, in order to generate a G interpolated signal of pixel a shown in FIG. 2A, data of pixel a and its eight surrounding pixels bounded by dotted line a1 are multiplied by G interpolation filter coefficients, and the products are added up. In the G interpolation filter shown in FIG. 2B, coefficients corresponding to G (green) pixels within dotted line a1 are "1" at the position of pixel a, and "0" at the positions of pixels at four corners. Hence, data of pixel a directly becomes the G interpolated signal.

On the other hand, for example, in order to generate a G interpolated signal of pixel b shown in FIG. 2A, data indicating the output levels of pixel b and its eight surrounding pixels bounded by dotted line b1 are multiplied by G interpolation filter coefficients, and the products are added up. In this case, in the G interpolation filter shown in FIG. 2B, coefficients corresponding to G (green) pixels within dotted line b1 are 0.25 at upper, lower, right, and left neighboring positions of pixel b. Hence, the G interpolated signal of pixel b is a value obtained by adding up products after multiplication of the coefficients at the upper, lower, right, and left neighboring positions. In other words, the G interpolated signal in this case is the average value of luminance data at the upper, lower, right, and left neighboring positions.

By the same method, R/B interpolated signals for all R (red)/B (blue) pixels are determined using R/B interpolation filters having different coefficients from those of the G interpolation filter.

In this manner, R, G, and B interpolated signals for all pixels are finally generated, as shown in FIG. 2D.

The sensitivity correction (shading correction) process executed in the image sensing apparatus shown in FIG. 1 will be described below with reference to FIGS. 3A and 3B and FIGS. 4A to 4C.

Figure 3B:
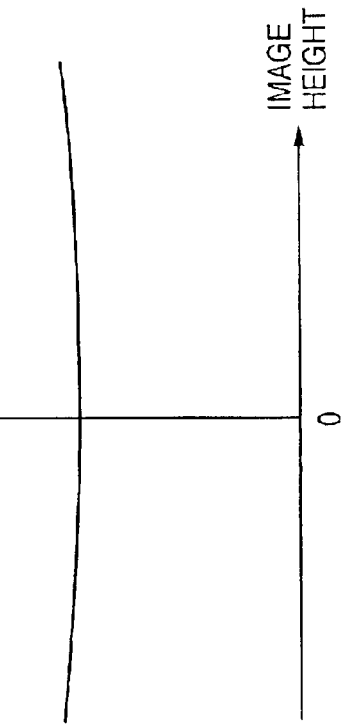
FIGS. 3A and 3B show shading correction coefficients used to correct shading produced due to a combination of a lens and an image sensing element device structure.
Figure 3A:
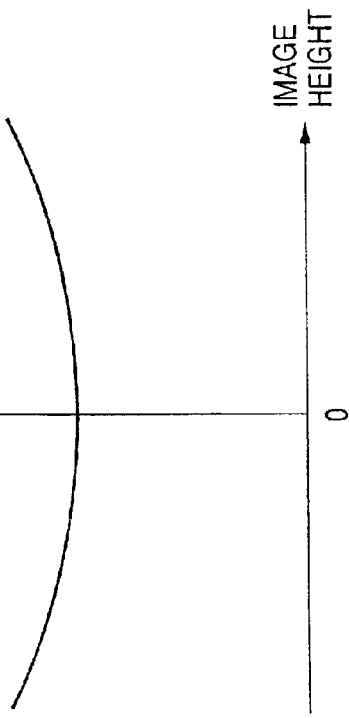

FIGS. 3A and 3B show shading correction coefficients used to correct shading produced due to a combination of the lens and image sensing element device structure.

More specifically, when the exit pupil position is relatively close to the image sensing element, and sensitivity drops largely on the peripheral portion of the image sensing element, the output signal from the image sensing element is amplified to increase the shading correction coefficients at positions of large image height (peripheral portion of the image sensing element), as shown in FIG. 3A. On the other hand, when the exit pupil position is far, and sensitivity does not so largely drop at the peripheral portion of the image sensing element, the output signal from the image sensing element is slightly amplified to slightly increase the shading correction coefficients at large image height positions (peripheral portion of the image sensing element), as shown in FIG. 3B. More specifically, the exit pupil position detector 2 shown in FIG. 1 reads out exit pupil position information in the exchangeable lens 3, corrects it in accordance with the zoom position, focus position, or the like, and sends the corrected information to the total control CPU 1, which calculates shading correction coefficients in accordance with the corrected exit pupil position information.

If the shading correction coefficients are determined strictly in correspondence with the image height, they must be set in a concentric pattern having the image sensing element as the center, thus making a hardware process difficult. Hence, in this embodiment, shading correction coefficients shown in FIGS. 4A to 4C are set.

Figure 4A:
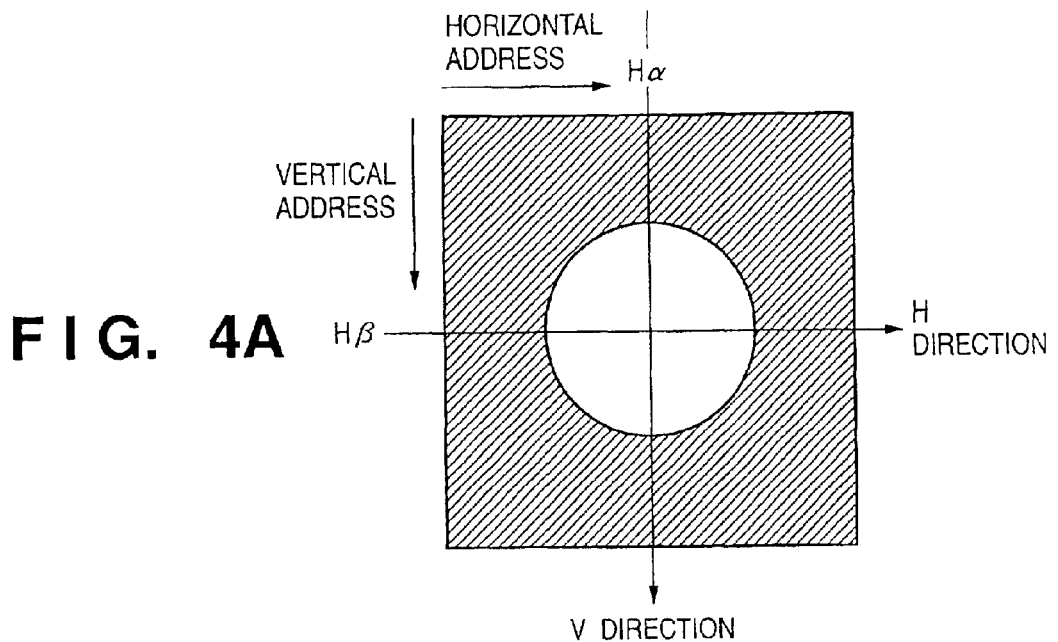
Figure 4B:
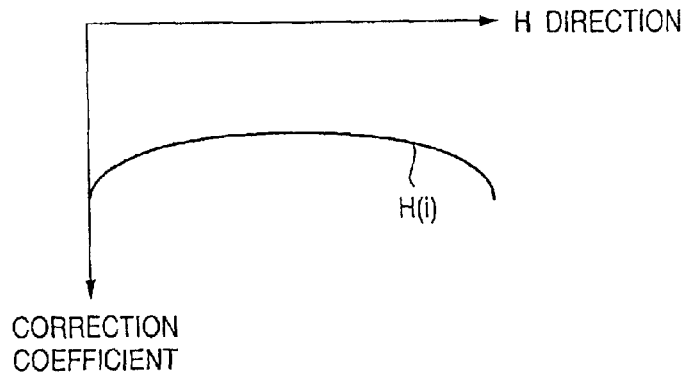
Figure 4C:
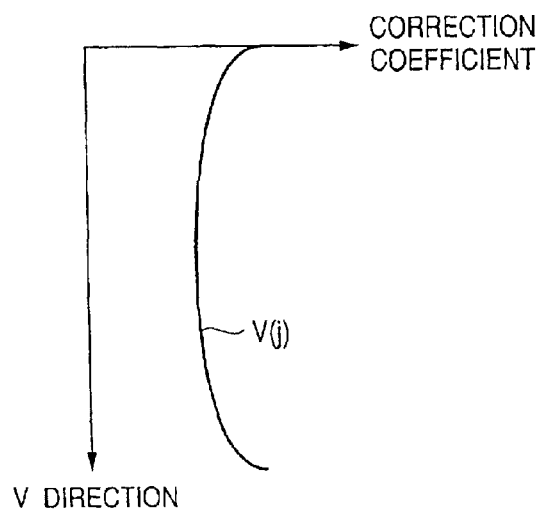

FIGS. 4A to 4C show shading correction coefficients in this embodiment. FIG. 4A shows the plane of the image sensing element, FIG. 4B shows horizontal shading correction coefficient components, and FIG. 4C shows vertical shading correction coefficient components.

More specifically, shading correction coefficients are set to increase sensitivity for the right and left peripheral portions of the image sensing element, which have low sensitivity, in the horizontal direction, and shading correction coefficients are set to increase sensitivity for the upper and lower peripheral portions of the image sensing element, which have low sensitivity, in the vertical direction, so that when the horizontal and vertical shading correction coefficients are multiplied each other on the image plane, pseudo concentric correction is done. This pseudo concentric correction can assure sufficiently satisfactory precision compared to concentric correction if the sensitivity changes sufficiently slowly with respect to the incident angle of incoming light to the image sensing element, and a change in sensitivity is small, as shown in FIG. 6 (to be described later).

A method of classifying the shading correction coefficients into horizontal and vertical components on the image sensing element plane will be described below with reference to FIGS. 5 to 7.

Figure 5:
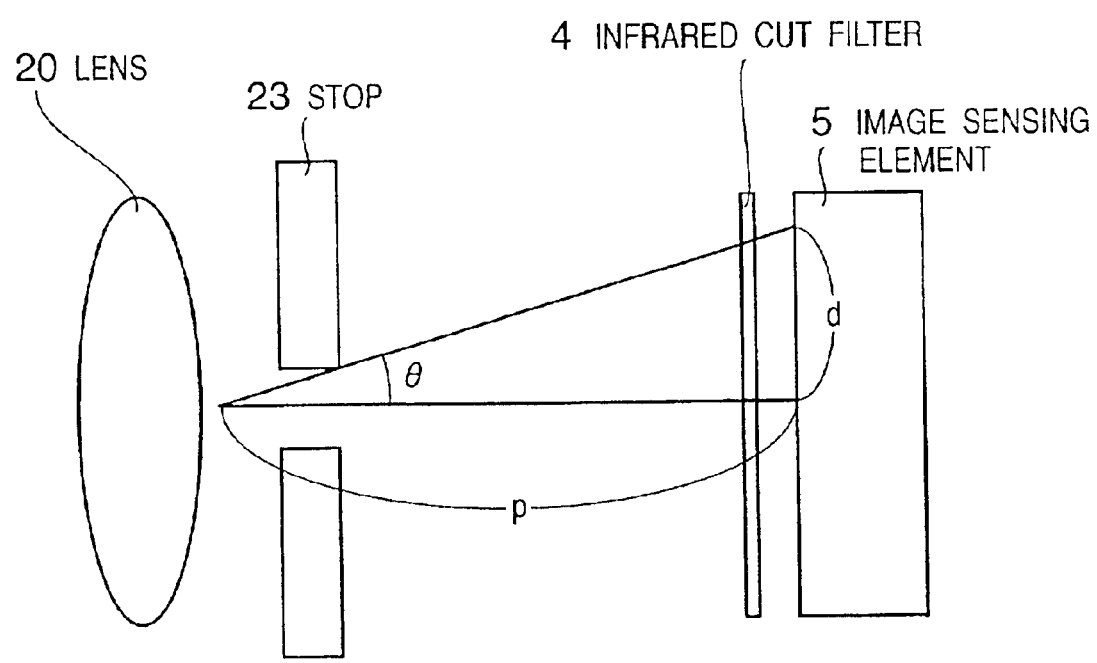
FIG. 5 shows an optical path from a lens to an image sensing element.

FIG. 5 shows an optical path from the lens to the image sensing element. Referring to FIG. 5, reference numeral 20 denotes a lens; and 23, a stop. θ represents the incident angle of light, d represents the distance of light that becomes incident on the image sensing element 5 from the center of the optical axis, i.e., the image height, and p is the distance between the lens 20 and image sensing element 5 on the optical axis, i.e., the exit pupil position.

Figure 6:
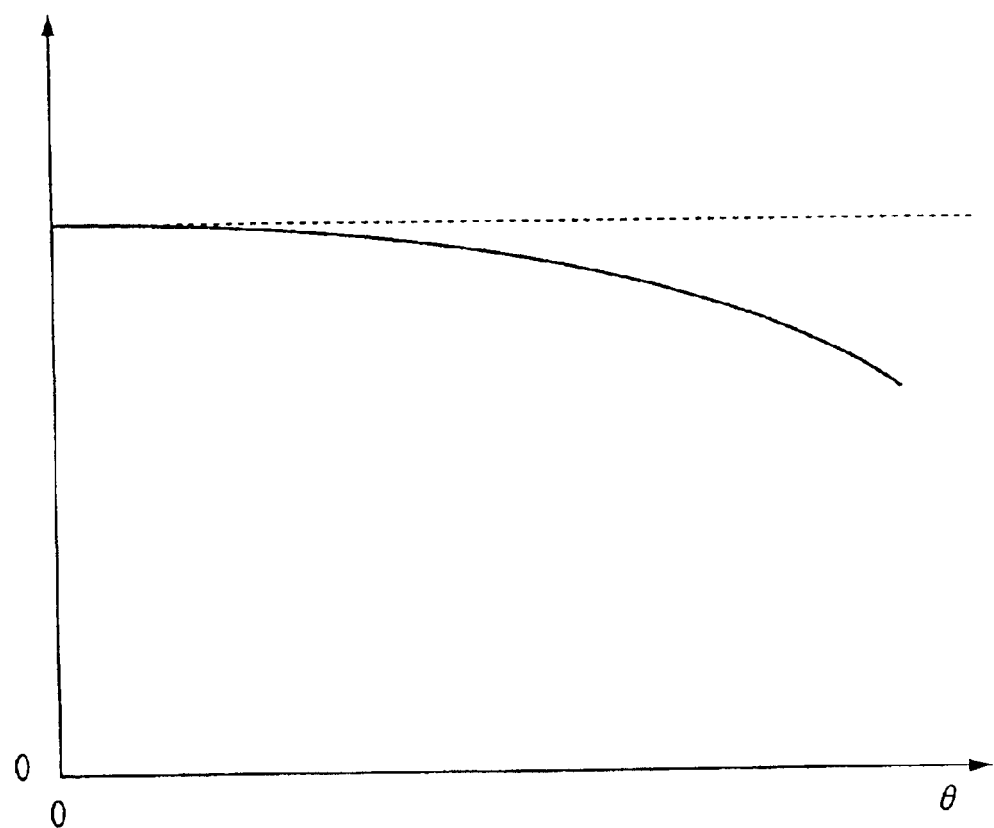
FIG. 6 is a graph showing sensitivity with respect to an incident angle θ.
Figure 7:
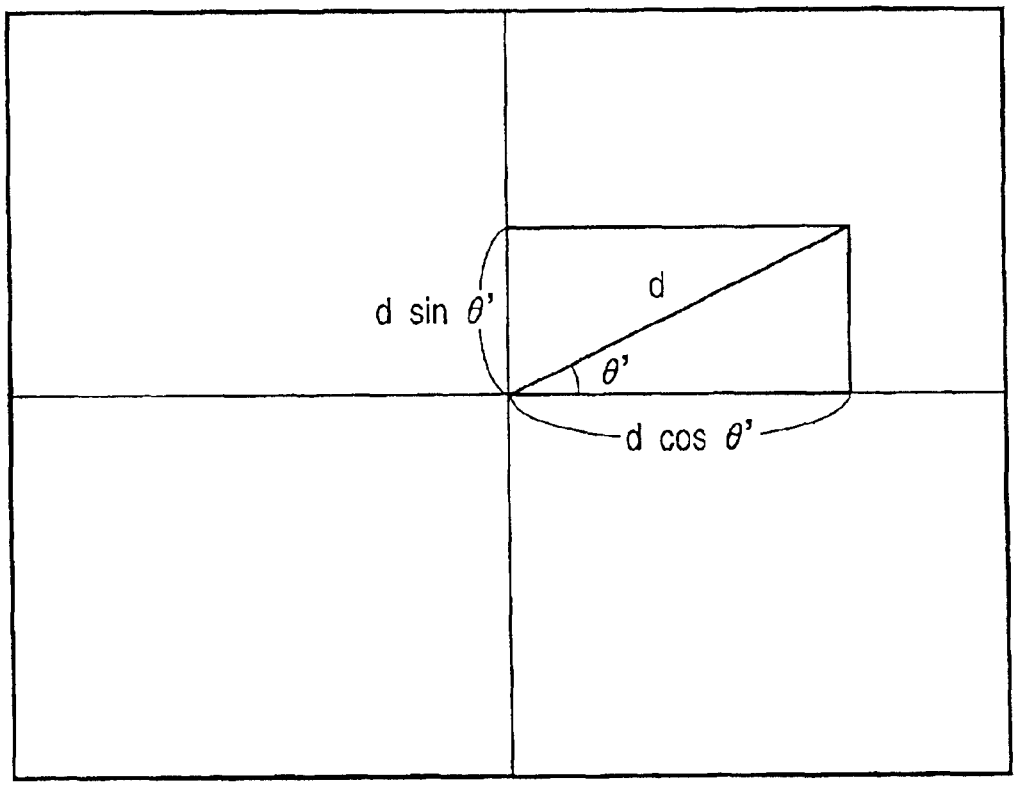
FIG. 7 shows X- and Y-components of an image height d on the image sensing element plane.

FIG. 6 is a graph showing sensitivity with respect to the incident angle θ, and FIG. 7 shows X- and Y-components of the image height d on the plane of the image sensing element 5.

Assume that the sensitivity with respect to the image height d (incident angle θ) is expressed, as shown in FIG. 6, and if y represents the sensitivity and θ represents the incident angle, the shading characteristics can be approximated by a function:

$$y = A \tan^2\theta + B \tan\theta + C \qquad (1)$$

$$\tan\theta = d/p \qquad (2)$$

where A, B, and C are constants, and d and p are respectively the image height and exit pupil position (distance), as described above.

As shown in FIG. 7, when the image height d having a slope which makes an angle θ' with the X-axis is divided into X- and Y-components dcos θ' and dsin θ' on the plane of the image sensing element 5, the following equations similar to equation (2) above can be obtained:

$$\tan\theta x = (d \cos\theta')/p \qquad (3)$$

$$\tan\theta y = (d \sin\theta')/p \qquad (4)$$

where θx and θy are the X- and Y-components of the incident angle θ on the plane of the image sensing element 5.

If these tan θx and tan θy are used, sensitivity y can be expressed by:

$$y = (A \tan^2\theta x + B \tan\theta x + C)(A \tan^2\theta y + B \tan\theta y + C) \qquad (5)$$

This equation (5) accurately matches equation (1).

With reference to equation (5) above, horizontal and vertical correction formulas are set as:

$$(A \tan^2\theta x + B \tan\theta x + C)^{-1} \qquad (6)$$

$$(A \tan^2\theta y + B \tan\theta y + C)^{-1} \qquad (7)$$

By multiplying output data from respective pixels of the image sensing element by correction formulas (6) and (7), horizontal shading-corrected data H(i) and vertical shading-corrected data V(j) are calculated.

The horizontal and vertical shading correction coefficients are calculated for respective pixels on the basis of correction formulas (6) and (7), and the total control CPU 1 shown in FIG. 1 stores these coefficients at address positions corresponding to the respective pixel positions in the H memory (H1) 12 and V memory (V1) 14.

In this manner, shading produced resulting from the optical relationship between the lens 20 and microlenses 21 is corrected using one each horizontal and vertical shading correction coefficients for the output for one frame of the image sensing element 5 irrespective of color filter performance and the like. That is, in the arrangement shown in FIG. 1, the multiplier circuit (MUL1) 18 multiplies output data for respective pixels output from the A/D conversion circuit 7 by the horizontal shading correction coefficient corresponding to the pixel positions to make horizontal correction, and the multiplier circuit (MUL2) 19 multiplies the outputs from the multiplier circuit 18 by vertical shading correction coefficients corresponding to the pixel positions, thus achieving shading correction of the output for one frame of the image sensing element 5.

As described above, in the lens-exchangeable image sensing apparatus, the lens stores exit pupil position information, and the image sensing apparatus main body calculates shading correction coefficients using the exit pupil position information of the lens upon photographing to make shading correction. In this manner, even when the lens is exchanged, shading correction can be satisfactorily executed.

Since shading produced due to a combination of the lens and image sensing element device structure depends on the incident angle of light rays that strike the image sensing element, if the incident angle of incoming light that strikes a pixel of interest is detected at the position of that pixel of the image sensing element, a shading correction amount can be calculated. That is, if the image height at the pixel of interest and the exit pupil position of the lens are available, the incident angle can be calculated and, hence, the shading correction amount can be calculated. At that time, when the exchangeable lens stores the exit pupil position information, and the image height is calculated by the image sensing apparatus main body, shading caused by a specific combination of optical characteristics of the lens and the image sensing element used can be accurately corrected independently of combinations of exchangeable lenses and image sensing apparatus main bodies.

The exit pupil position information of the lens, which is used to calculate shading correction coefficients, is corrected in accordance with at least one of the zoom position, focus position, image height, and aperture value. Hence, the shading correction precision can be improved.

A method of preventing color shading produced depending on the device structure of the image sensing element 5 and the optical condition of the lens 20 (exchangeable lens 3) will be described below.

Figure 12A:
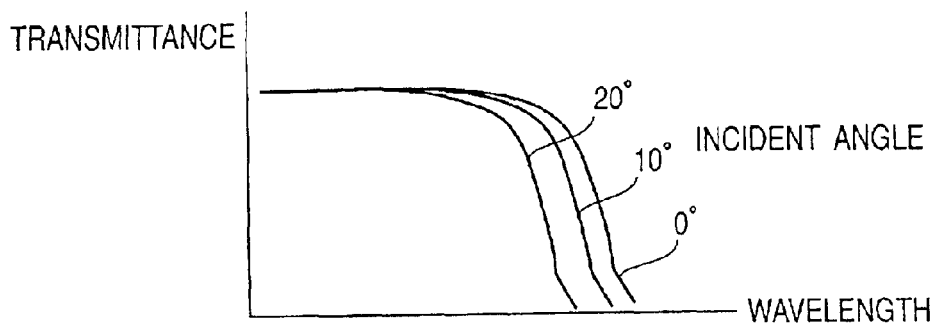
FIGS. 12A to 12C show the principle of color shading due to multi-layered type reflective infrared cut filters.
Figure 12B:
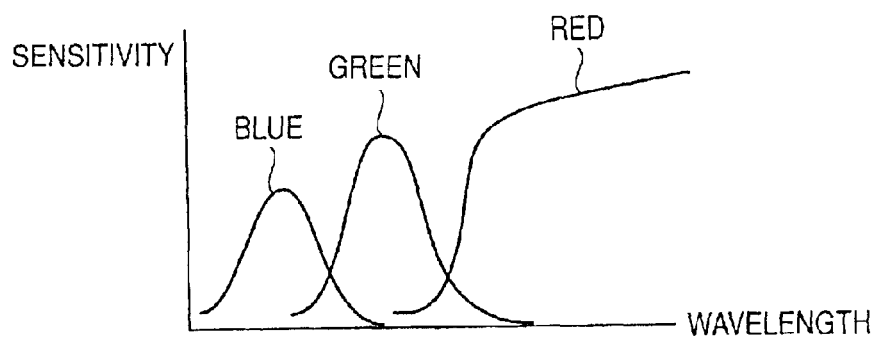
Figure 12C:
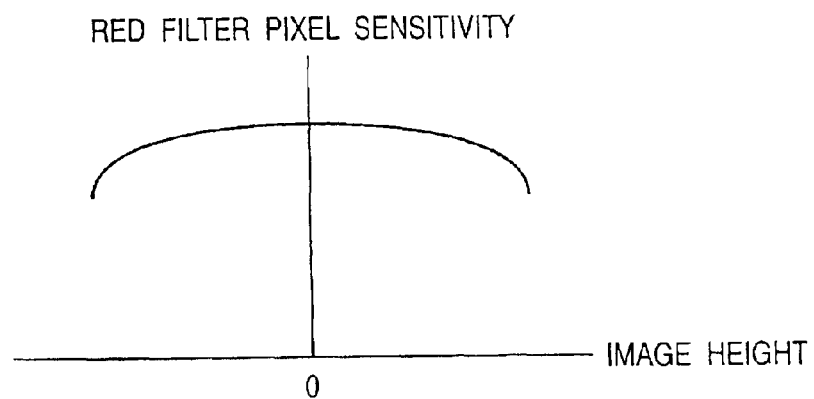

When the multi-layered type reflective infrared cut filters 4 are used in front of the image sensing element 5, as shown in FIG. 5, and the image sensing element 5 comprises RGB primary color Bayer filters shown in FIG. 12B, the sensitivity of pixels having a red filter has large dependence on the incident angle due to the dependence on the incident angle of the spectral transmission characteristics of the infrared cut filters shown in FIG. 12A. For this reason, shading is considerably produced in only a red channel, as shown in FIG. 12C, and shading produced in other channels is negligible compared to the red channel.

Such color shading produced due to an optical combination of the infrared cut filters 4 and exchangeable lens 3 becomes more conspicuous with increasing incident angle of incoming light to the peripheral portion of the infrared cut filters 4, as the exit pupil position of the exchangeable lens 3 is closer to the image sensing element 5.

FIGS. 8A to 8E show an RGB Bayer filter matrix and shading correction coefficients corresponding to the matrix. FIG. 8A shows the RGB Bayer filter matrix, FIG. 8B shows shading correction coefficients H1(i) and H2(i) corresponding to the first row of the RGB primary color Bayer filters, FIG. BC shows shading correction coefficients H1(i) and H2(i) corresponding to the second row of the RGB primary color Bayer filters, FIG. 8D shows shading correction coefficients V1(j) and V2(j) corresponding to the first column of the RGB primary color Bayer filters, and FIG. 8E shows shading correction coefficients V1(j) and V2(j) corresponding to the second column of the RGB primary color Bayer filters.

Since the RGB primary color Bayer filters have a matrix shown in FIG. 8A, G and R alternately appear in, e.g., the first horizontal line (first row), and the output sensitivity of a pixel (G) located at each odd-numbered position counted from the left end is different from that of a pixel (R) located at each even-numbered position. That is, the output of each pixel having an R filter is greatly lower than that of a pixel having a G filter at the peripheral portion. For this reason, the shading correction coefficients H1(i) and H2(i) shown in FIG. 8B are set. The shading correction coefficients H1(i) are applied to the outputs from the pixels having the R filter, and are stored in the H memory (H1) 12 in FIG. 1. On the other hand, the correction coefficients H2(i) are applied to the outputs from the pixels having the G filter, and are stored in the H memory (H2) 13 in FIG. 1.

Since B and G alternately appear in the second horizontal line (second row) of the RGB primary color Bayer filters, the output sensitivity of a pixel (B) located at each odd-numbered position counted from the left end is nearly the same as that of a pixel (G) located at each even-numbered position. For this reason, identical shading correction coefficients H1(i) and H2(i) shown in FIG. 8C are set. The shading correction coefficients H1(i) are applied to the outputs from the pixels having a B filter, and are stored in the H memory (H1) 12 in FIG. 1. On the other hand, the shading correction coefficients H2(i) are applied to the outputs from the pixels having a G filter, and are stored in the H memory (H2) 13 in FIG. 1.

In the first vertical line (first column) of the RGB primary color Bayer filters, since G and B alternately appear, the output sensitivity of a pixel (G) located at each odd-numbered position counted from the upper end is nearly the same as that of a pixel (B) located at each even-numbered position. For this reason, identical shading correction coefficients V1(j) and V2(j) shown in FIG. 8D are set. The shading correction coefficients V1(j) are applied to the outputs from the pixels having a G filter, and are stored in the V memory (V1) 14 in FIG. 1. On the other hand, the shading correction coefficients V2(j) are applied to the outputs from the pixels having a B filter, and are stored in the V memory (V2) 15 in FIG. 1.

On the other hand, since R and G alternately appear in the second vertical line (second column) of the RGB primary color Bayer filters, the output sensitivity of a pixel (G) located at each odd-numbered position counted from the upper end is different from that of a pixel (G) located at each even-numbered position. That is, the output of each pixel having an R filter is greatly lower than that of a pixel having a G filter at the peripheral portion. For this reason, the shading correction coefficients V1(j) and V2(j) shown in FIG. 8E are set. The shading correction coefficients V1(j) are applied to the outputs from the pixels having the R filter, and are stored in the V memory (V1) 14 in FIG. 1. On the other hand, the correction coefficients V2(j) are applied to the outputs from the pixels having the G filter, and are stored in the V memory (V2) 15 in FIG. 1.

In this way, the shading correction coefficients are set and stored, and luminance data for each pixel from the image sensing element 5 is multiplied by the corresponding shading correction coefficient read out based on two-dimensional addresses of the position of the pixel of interest. This process will be described below with reference to FIG. 9.

Figure 9:
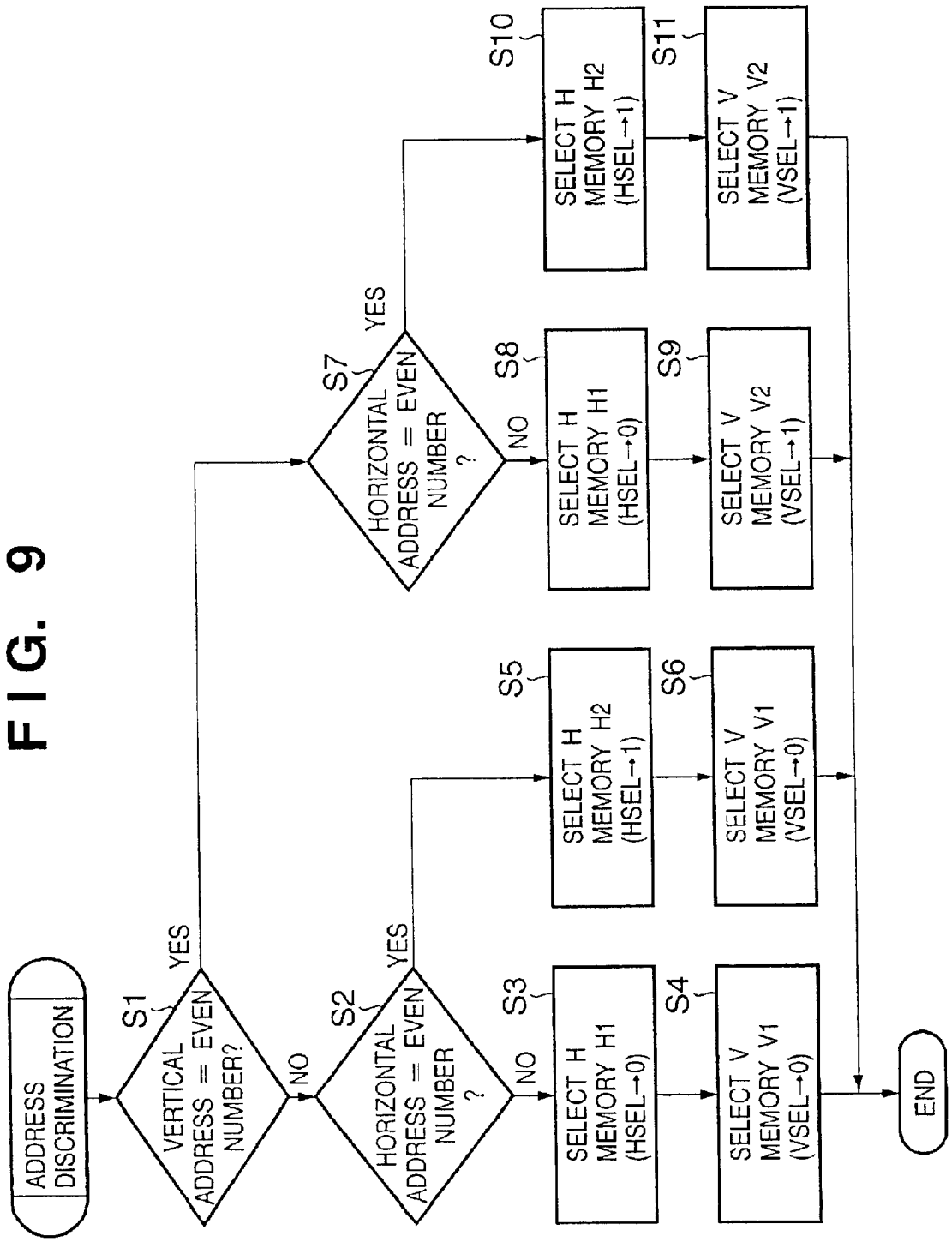
FIG. 9 is a flow chart showing the sequence of an output process of predetermined signals HSEL and VSEL, which process is executed by an address discrimination circuit.
Figure 10:
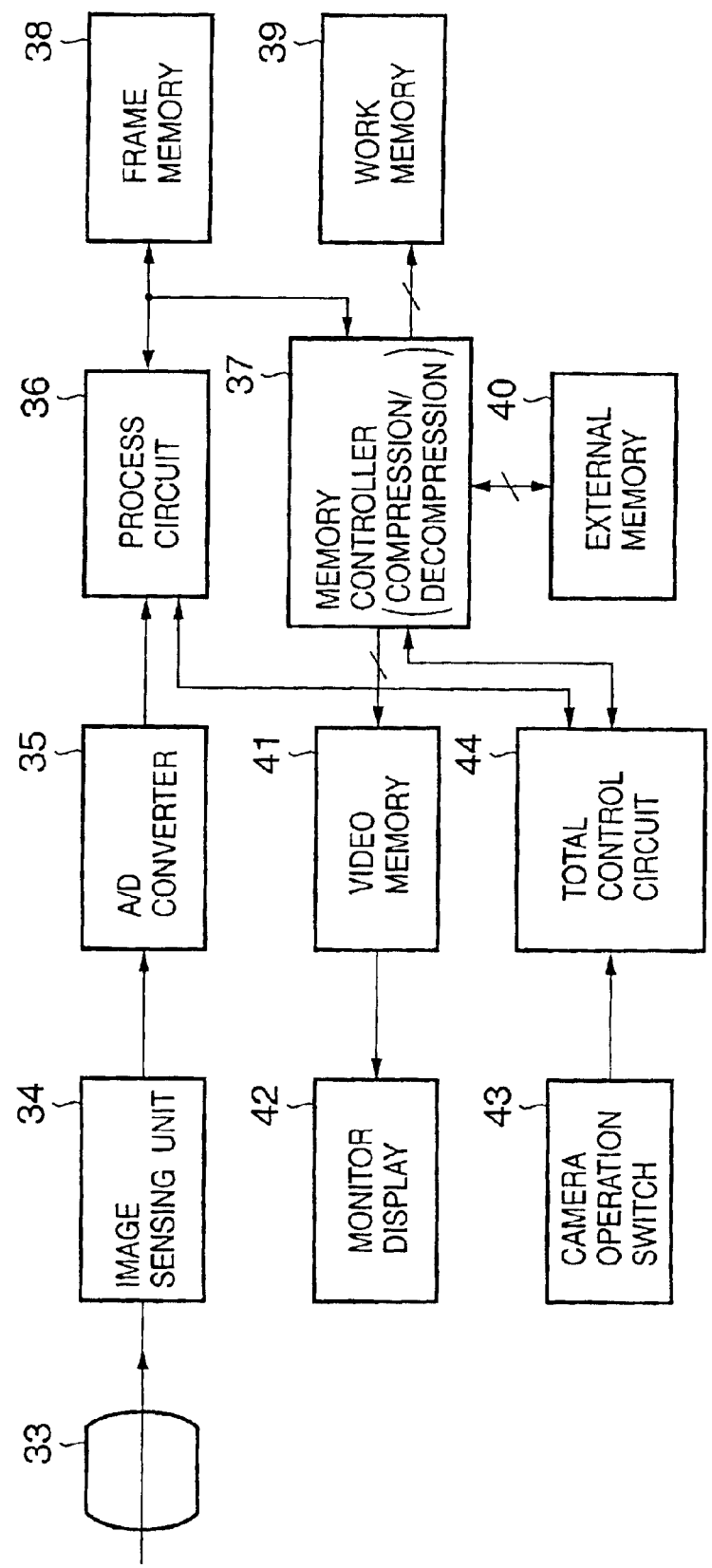
FIG. 10 is a block diagram showing an example of the arrangement of a conventional lens-exchangeable digital still camera.
Figure 11B:
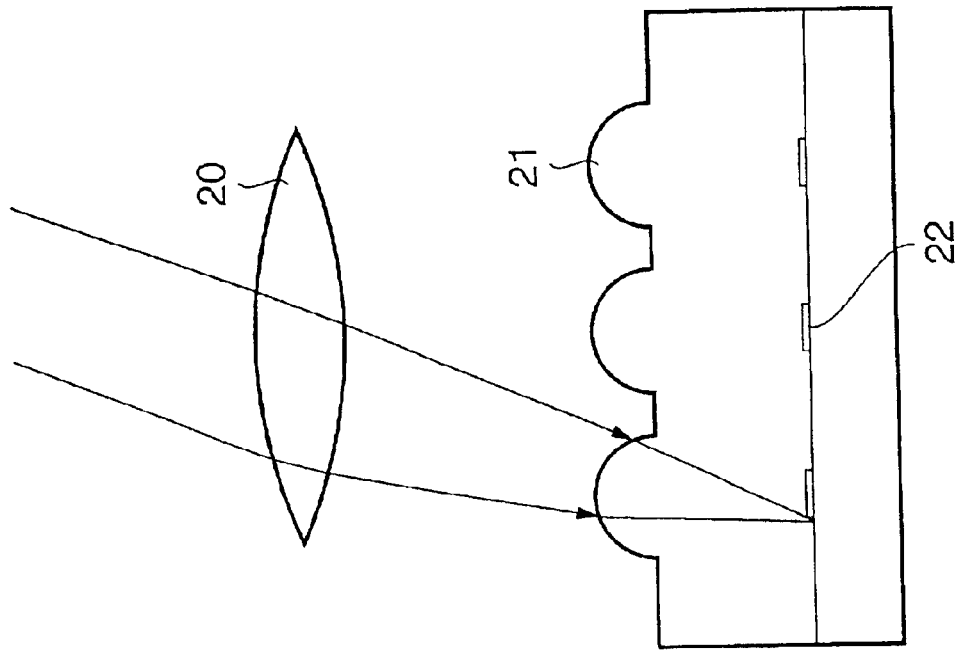
FIGS. 11A and 11B show the principle of shading produced depending on the relationship between the microlens position and the angle of incoming light from a lens.
Figure 11A:
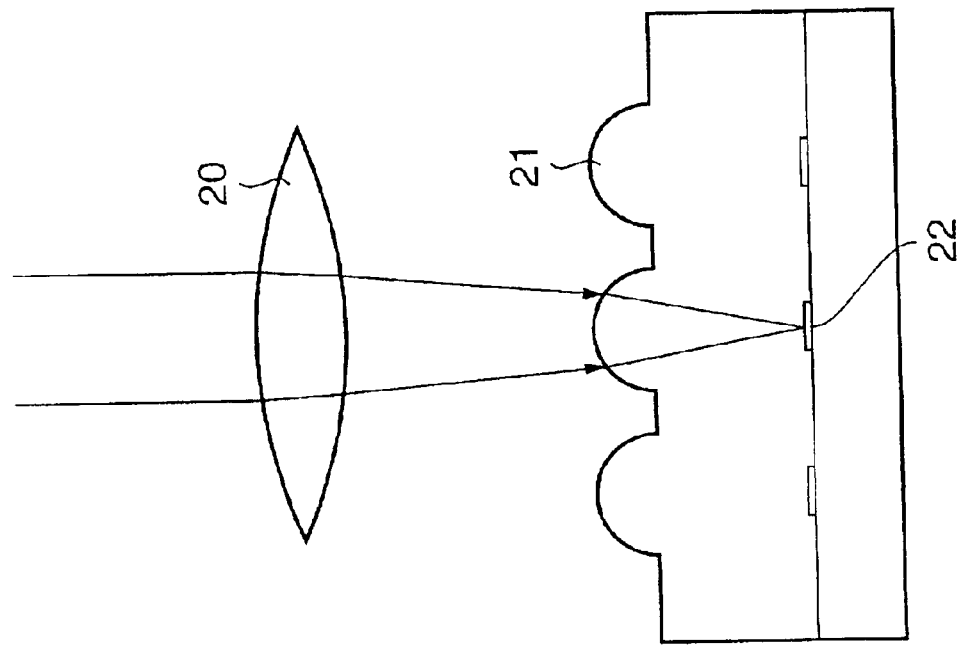

FIG. 9 is a flow chart showing the sequence of an output process of the predetermined signals HSEL and VSEL executed by the address discrimination circuit 11.

It is checked in step S1 if an address in the vertical (column) direction of the RGB primary color Bayer filters of the two-dimensional addresses of a pixel of interest sent from the address generation circuit 10 is an even number. Also, it is checked in steps S2 and S7 if an address in the horizontal (row) direction of the RGB primary color Bayer filters of the two-dimensional addresses of the pixel of interest sent from the address generation circuit 10 is an even number.

As a consequence of such checking, if the address in the vertical (column) direction of the RGB primary color Bayer filters of the two-dimensional addresses of the pixel of interest is an odd number (i.e., the odd-numbered row in a two-dimensional image sensing element matrix), and the address in the horizontal (row) direction is an odd number (i.e., the odd-numbered column in the two-dimensional image sensing element matrix), the flow advances to step S3, and the address discrimination circuit 11 sets the predetermined signal HSEL at L level (0 level). As a result, the selector 16 sends the shading correction coefficients H1(i) as the outputs from the H memory (H1) 12 to the multiplier circuit (MUL1) 18.

In step S4, the address discrimination circuit 11 sets the predetermined signal VSEL at L level (0 level). As a consequence, the selector 17 sends the shading correction coefficients V1(j) as the output from the V memory (V1) 14 to the multiplier circuit (MUL2) 19.

This state will be explained below with reference to FIGS. 8A to 8E.

That is, if the pixel of interest is an upper left G pixel 22 shown in FIG. 8A, the multiplier circuit (MUL1) 18 makes multiplication correction for output data of pixels using the shading correction coefficients H1(i) (the left side of the H direction corresponds to a lower address in the horizontal direction, and the right side of the H direction corresponds to an upper address in the horizontal direction) indicated by the solid curve in FIG. 8B. On the other hand, the multiplier circuit (MUL2) 19 makes multiplication correction for output data of pixels using the characteristics of the shading correction coefficients V1(j) (the upper side of the V direction corresponds to a lower address in the vertical direction, and the lower side of the V direction corresponds to an upper address in the vertical direction) indicated by the solid curve in FIG. 8D.

On the other hand, as a result of the above checking processes, if the address in the vertical (column) direction of the RGB primary color Bayer filters of the two-dimensional addresses of the pixel of interest is an odd number (i.e., the odd-numbered row in the two-dimensional image sensing element matrix), and the address in the horizontal (row) direction is an even number (i.e., the even-numbered column in the two-dimensional image sensing element matrix), the flow advances to step S5, and the address discrimination circuit 11 sets the predetermined signal HSEL at H level (1 level). Consequently, the selector 16 sends the shading correction coefficients H2(i) as the outputs from the H memory (H2) 13 to the multiplier circuit (MUL1) 18.

In step S6, the address discrimination circuit 11 sets the predetermined signal VSEL at L level (0 level). Thus, the selector 17 sends the shading correction coefficients V1(j) as the output from the V memory (V1) 14 to the multiplier circuit (MUL2) 19.

For example, if the pixel of interest is an R pixel 23 shown in FIG. 8A, the multiplier circuit (MUL1) 18 makes multiplication correction for output data of pixels using the shading correction coefficients H2(i) (the left side of the H direction corresponds to a lower address in the horizontal direction, and the right side of the H direction corresponds to an upper address in the horizontal direction) indicated by the broken curve in FIG. 8B. On the other hand, the multiplier circuit (MUL2) 19 makes multiplication correction for output data of pixels using the characteristics of the shading correction coefficients V1(j) (the upper side of the V direction corresponds to a lower address in the vertical direction, and the lower side of the V direction corresponds to an upper address in the vertical direction) indicated by the solid curve in FIG. 8E.

As a result of the above checking process, if the address in the vertical (column) direction of the RGB primary color Bayer filters of the two-dimensional addresses of the pixel of interest is an even number (i.e., the even-numbered row in the two-dimensional image sensing element matrix), and the address in the horizontal (row) direction is an odd number (i.e., the odd-numbered column in the two-dimensional image sensing element matrix), the flow advances to step S8, and the address discrimination circuit 11 sets the predetermined signal HSEL at L level (0 level). Hence, the selector 16 sends the shading correction coefficients H1(i) as the outputs from the H memory (H1) 12 to the multiplier circuit (MUL1) 18.

In step S9, the address discrimination circuit 11 sets the predetermined signal VSEL at H level (1 level). As a consequence, the selector 17 sends the shading correction coefficients V2(j) as the output from the V memory (V2) 15 to the multiplier circuit (MUL2) 19.

For example, if the pixel of interest is a B pixel 24 shown in FIG. 8A, the multiplier circuit (MUL1) 18 makes multiplication correction for output data of pixels using the shading correction coefficients H1(i) (the left side of the H direction corresponds to a lower address in the horizontal direction, and the right side of the H direction corresponds to an upper address in the horizontal direction) indicated by the solid curve in FIG. 8C. On the other hand, the multiplier circuit (MUL2) 19 makes multiplication correction for output data of pixels using the characteristics of the shading correction coefficients V2(j) (the upper side of the V direction corresponds to a lower address in the vertical direction, and the lower side of the V direction corresponds to an upper address in the vertical direction) indicated by the solid curve in FIG. 8D.

As a result of the above checking process, if the address in the vertical (column) direction of the RGB primary color Bayer filters of the two-dimensional addresses of the pixel of interest is an even number (i.e., the even-numbered row in the two-dimensional image sensing element matrix), and the address in the horizontal (row) direction is an even number (i.e., the even-numbered column in the two-dimensional image sensing element matrix), the flow advances to step S10, and the address discrimination circuit 11 sets the predetermined signal HSEL at H level (1 level). Consequently, the selector 16 sends the shading correction coefficients H2(i) as the outputs from the H memory (H2) 13 to the multiplier circuit (MUL1) 18.

In step S11, the address discrimination circuit 11 sets the predetermined signal VSEL at H level (1 level). Hence, the selector 17 sends the shading correction coefficients V2(j) as the output from the V memory (V2) 15 to the multiplier circuit (MUL2) 19.

For example, if the pixel of interest is a G pixel 25 shown in FIG. 8A, the multiplier circuit (MUL1) 18 makes multiplication correction for output data of pixels using the shading correction coefficients H2(i) (the left side of the H direction corresponds to a lower address in the horizontal direction, and the right side of the H direction corresponds to an upper address in the horizontal direction) indicated by the solid curve in FIG. 8C. On the other hand, the multiplier circuit (MUL2) 19 makes multiplication correction for output data of pixels using the characteristics of the shading correction coefficients V2(j) (the upper side of the V direction corresponds to a lower address in the vertical direction, and the lower side of the V direction corresponds to an upper address in the vertical direction) indicated by the broken curve in FIG. 8E.

In this way, since the address discrimination circuit 11 discriminates the two-dimensional addresses of the pixel of interest, and switches the shading correction coefficient tables by checking if the horizontal and vertical addresses are odd or even numbers. Thus, color shading produced due to an optical combination of the exchangeable lens 3 and infrared cut filters 4 shown in FIG. 12C can be prevented. In the above description, red shading is prevented. However, the present invention is not limited to red, but can be applied to color shading of other colors.

In this embodiment, two different shading correction coefficients are prepared respectively in the horizontal and vertical directions. Alternatively, different shading correction coefficients may be prepared in correspondence with R, G, and B. Furthermore, when complementary color filters are used, four different types of shading correction coefficients may be prepared in each direction.

The objects of the present invention can also be achieved by supplying a storage medium, which records a program code of a software program that can implement the functions of the above-mentioned embodiment to a system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the above embodiment, even when the lens is exchanged, shading resulting from a specific combination of optical characteristics of the lens and the image sensing element used can be adequately corrected.

Also, the shading correction precision can be improved.

Furthermore, color shading produced in only a specific channel can be adequately corrected even when the lens is exchanged.

The present invention is not limited to the above embodiments and various changes and modifications can be made within the sprit and scope of the present invention. Therefore, to apprise the public of the scope of the present invention the following claims are made.

What is claimed is:

1. An image sensing apparatus which comprises an image sensing element and can exchange a lens, comprising:
   an extraction device adapted to extract information concerning the lens which is held in the lens; and
   a correction device adapted to correct an image data from the image sensing element by using a first correction data which has a correction component of a first direction which is one of two orthogonal directions in a surface of the image sensing element, and a second correction data which has a correction component of a second direction which is the other one of the two orthogonal directions in the surface of the image sensing element,
   wherein the first correction data and the second correction data are data which are based on the information concerning the lens extracted by said extraction device.

2. The apparatus according to claim 1, further comprising:
   a calculation device adapted to calculate the first correction data and the second correction data on the basis of the information extracted by said extraction device,
   wherein the information extracted by said extraction device is an exit pupil position information.

3. The apparatus according to claim 2, wherein said calculation device calculates the first correction data and the second correction data, on the basis of the exit pupil position information extracted by said extraction device, and an image height of a corresponding pixel.

4. The apparatus according to claim 3, further comprising:
   a correction device for correcting the exit pupil position information extracted by said extraction device in accordance with at least one of a zoom position, focus position, image height, and aperture value of the lens, and sending the corrected exit pupil position information to said calculation device.

5. The apparatus according to claim 3, wherein the exit pupil position information is information that represents a distance between the lens and the image sensing element on an optical axis.

6. The apparatus according to claim 3, wherein the image height is a distance between a position of a pixel of interest and a point on an optical axis on the plane of the image sensing element.

7. An image sensing apparatus which comprises an image sensing element and can exchange a lens, comprising:
   a storage device for storing shading correction coefficients respectively corresponding to pixels of the image sensing element; and
   a correction device for making a correction calculation of pixel data read out from each pixel of the image sensing element by extracting the shading correction coefficient associated with the corresponding pixel from the shading correction coefficients stored in said storage device,
   wherein said correction device independently corrects pixels which are influenced by a color filter, which does not transmit a specific wavelength range and is inserted between the lens and the image sensing element, and pixels which are not influenced by the color filter, on the basis of shading correction coefficients stored in said storage device.

8. The apparatus according to claim 7, further comprising:
   an extraction device for extracting exit pupil position information stored in the lens; and
   a calculation device for calculating shading correction coefficients on the basis of the exit pupil position information extracted by said extraction device, and sending the shading correction coefficients to said storage device.

9. The apparatus according to claim 8, wherein said calculation device calculates the shading correction coefficients on the basis of the exit pupil position information extracted by said extraction device, and an image height of a corresponding pixel.

10. The apparatus according to claim 9, further comprising:
    a correction device for correcting the exit pupil position information extracted by said extraction device in accordance with at least one of a zoom position, focus position, image height, and aperture value of the lens, and sending the corrected exit pupil position information to said calculation device.

11. The apparatus according to claim 9, wherein the exit pupil position information is information that represents a distance between the lens and the image sensing element on an optical axis.

12. The apparatus according to claim 9, wherein the image height is a distance between a position of a pixel of interest and a point on an optical axis on the plane of the image sensing element.

13. A shading correction method applied to an image sensing apparatus, which comprises an image sensing element and can exchange a lens, comprising:
    the extraction step of extracting information concerning the lens which is held in the lens; and
    the correction step of correcting an image data from the image sensing element by using a first correction data which has a correction component of a first direction which is one of two directions in a surface of the image sensing element, and a second correction data which has a correction component of a second direction which is the other one of the two orthogonal directions in the surface of the image sensing element,
    wherein the first correction data and the second correction data are data which are based on the information concerning the lens extracted in the extraction step.

14. The method according to claim 13, further comprising:
    the calculation step of calculating the first correction data and the second correction data on the basis of the information extracted in the extraction step,
    wherein the information extracted in the extraction step is an exit pupil position information.

15. The method according to claim 14, wherein the calculation step includes the step of calculating the first correction data and the second correction data on the basis of the exit pupil position information extracted in the extraction step, and an image height of a corresponding pixel.

16. The method according to claim 15, further comprising:
    the correction step of correcting the exit pupil position information extracted in the extraction step in accordance with at least one of a zoom position, focus position, image height, and aperture value of the lens, and supplying the corrected exit pupil position information to the calculation in the calculation step.

17. A program for making a computer implement a shading correction method cited in claim 13.

18. A storage medium for computer-readably storing a program cited in claim 17.

19. A shading correction method applied to an image sensing apparatus, which comprises an image sensing element and can exchange a lens, comprising:

the image sensing step of obtaining pixel data from the image sensing element; and the correction step of making a correction calculation of pixel data read out from each pixel of the image sensing element by extracting the shading correction coefficient associated with the corresponding pixel from shading correction coefficients stored in a storage device, which stores shading correction coefficients respectively corresponding to pixels of the image sensing element, wherein the shading correction coefficients are independently stored in the storage device in correspondence with pixels which are influenced by a color filter, which does not transmit a specific wavelength range and is inserted between the lens and the image sensing element, and pixels which are not influenced by the color filter.

20. The method according to claim 19, further comprising:

the extraction step of extracting exit pupil position information stored in the lens; and the calculation step of calculating shading correction coefficients on the basis of the exit pupil position information extracted in the extraction step, and sending the shading correction coefficients to said storage device.

21. The method according to claim 20, wherein the calculation step includes the step of calculating the shading correction coefficients on the basis of the exit pupil position information extracted in the extraction step, and an image height of a corresponding pixel.

22. The method according to claim 21, further comprising:

the correction step of correcting the exit pupil position information extracted in the extraction step in accordance with at least one of a zoom position, focus position, image height, and aperture value of the lens, and supplying the corrected exit pupil position information to the calculation in the calculation step.

23. A program for making a computer impleement a shading correction method cited in claim 19.

24. A storage medium for computer-readably storing a program cited in claim 23.

* * * * *